(12) United States Patent
Herr et al.

(10) Patent No.: US 11,093,697 B2
(45) Date of Patent: Aug. 17, 2021

(54) METHOD AND SYSTEM FOR SUGGESTING REVISIONS TO AN ELECTRONIC DOCUMENT

(71) Applicant: BLACKBOILER, INC., Arlington, VA (US)

(72) Inventors: Jonathan Herr, Washington, DC (US); Daniel P. Broderick, Arlington, VA (US); Daniel Edward Simonson, Arlington, VA (US)

(73) Assignee: BLACKBOILER, INC., Arlington, VA (US)

( * ) Notice: Subject to any disclaimer, the term of this patent is extended or adjusted under 35 U.S.C. 154(b) by 0 days.

(21) Appl. No.: 17/185,417

(22) Filed: Feb. 25, 2021

(65) Prior Publication Data

US 2021/0182471 A1     Jun. 17, 2021

Related U.S. Application Data

(63) Continuation of application No. 17/009,069, filed on Sep. 1, 2020, now Pat. No. 10,970,475, which is a
(Continued)

(51) Int. Cl.
*G06F 40/166* (2020.01)
*G06F 40/186* (2020.01)
(Continued)

(52) U.S. Cl.
CPC .......... *G06F 40/166* (2020.01); *G06F 40/186* (2020.01); *G06F 40/197* (2020.01);
(Continued)

(58) Field of Classification Search
CPC .... G06F 40/166; G06F 40/253; G06F 40/186; G06F 40/197; G06F 16/334; G06F 40/30;
(Continued)

(56) References Cited

U.S. PATENT DOCUMENTS 5,692,206 A    11/1997   Shirley
6,438,543 B1    8/2002   Kazi
(Continued)

OTHER PUBLICATIONS

Zhemin Zhu et al, A Monolingual Tree-based Translation Model for Sentence Simplification, Proceedings of the 23rd International Conference on Computational Linguistics (Coling 2010), pp. 1353-1361, Beijing, Aug. 2010.
(Continued)

*Primary Examiner* — Quoc A Tran
(74) *Attorney, Agent, or Firm* — Rothwell, Figg, Ernst & Manbeck, P.C.

(57) ABSTRACT

Disclosed is a method for suggesting revisions to a document-under-analysis ("DUA") from a seed database, the seed database including a plurality of original texts each respectively associated with one of a plurality of final texts. The method includes tokenizing the DUA into a plurality of statements-under-analysis ("SU As"), selecting a first SUA of the plurality of SU As, generating a first similarity score for each of the plurality of original texts, the similarity score representing a degree of similarity between the first SUA and each of the original texts, selecting a first candidate original text of the plurality of the original texts, and creating an edited SUA ("ESUA") by modifying a copy of the first SUA consistent with a first candidate final text associated with the first candidate original text.

17 Claims, 9 Drawing Sheets

Related U.S. Application Data continuation of application No. 16/689,685, filed on Nov. 20, 2019, now Pat. No. 10,824,797, which is a continuation of application No. 16/244,217, filed on Jan. 10, 2019, now Pat. No. 10,489,500, which is a continuation of application No. 15/227,093, filed on Aug. 3, 2016, now Pat. No. 10,216,715.

(60) Provisional application No. 62/200,261, filed on Aug. 3, 2015.

(51) Int. Cl.

| | | |
|---|---|---|
| *G06F 40/197* | (2020.01) | |
| *G06F 40/253* | (2020.01) | |
| *G06Q 10/10* | (2012.01) | |
| *G06F 16/93* | (2019.01) | |
| *G06F 40/295* | (2020.01) | |
| *G06F 16/951* | (2019.01) | |
| *G06F 40/30* | (2020.01) | |
| *G06F 40/284* | (2020.01) | |
| *G06N 3/04* | (2006.01) | |
| *G06N 3/08* | (2006.01) | |
| *G06F 16/33* | (2019.01) | |
| *G06F 17/00* | (2019.01) | |

(52) U.S. Cl.
CPC .......... *G06F 40/253* (2020.01); *G06F 16/334* (2019.01); *G06F 16/93* (2019.01); *G06F 16/951* (2019.01); *G06F 40/284* (2020.01); *G06F 40/295* (2020.01); *G06F 40/30* (2020.01); *G06N 3/0454* (2013.01); *G06N 3/08* (2013.01); *G06Q 10/10* (2013.01)

(58) Field of Classification Search
CPC .... G06F 16/951; G06F 40/284; G06F 40/295; G06F 16/93; G06F 17/30011; G06F 17/30864; G06F 17/30675; G06F 17/274; G06F 17/277; G06F 17/2785; G06Q 10/10; G06N 3/0454; G06N 3/08
See application file for complete search history.

(56) References Cited

U.S. PATENT DOCUMENTS

| | | | |
|---|---|---|---|
| 7,080,076 | B1 | 7/2006 | Williamson |
| 7,519,607 | B2 | 4/2009 | Anderson, IV |
| 7,668,865 | B2 | 2/2010 | McDonald |
| 8,037,086 | B1 | 10/2011 | Upstill |
| 8,046,372 | B1* | 10/2011 | Thirumalai ........... G06F 16/313 707/749 |
| 8,442,771 | B2 | 5/2013 | Wang |
| 8,788,523 | B2 | 7/2014 | Martin et al. |
| 8,886,648 | B1* | 11/2014 | Procopio ............... G06F 16/93 707/737 |
| 9,514,103 | B2 | 12/2016 | Kletter |
| 10,102,193 | B2 | 10/2018 | Riediger |
| 10,127,212 | B1 | 11/2018 | Kim |
| 10,191,893 | B2 | 1/2019 | Riediger |
| 2002/0002567 | A1 | 1/2002 | Kanie |
| 2003/0023539 | A1 | 1/2003 | Wilce |
| 2003/0074633 | A1 | 4/2003 | Boulmakoul |
| 2004/0102958 | A1 | 5/2004 | Anderson |
| 2005/0182736 | A1 | 8/2005 | Castellanos |
| 2007/0073532 | A1 | 3/2007 | Brockett et al. |
| 2007/0192355 | A1 | 8/2007 | Vasey |
| 2007/0192688 | A1 | 8/2007 | Vasey |
| 2007/0300295 | A1 | 12/2007 | Kwok |
| 2008/0103759 | A1 | 5/2008 | Dolan et al. |
| 2009/0007267 | A1 | 1/2009 | Hoffmann |
| 2009/0099993 | A1 | 4/2009 | Seuss |
| 2009/0138257 | A1 | 5/2009 | Verma |
| 2009/0138793 | A1 | 5/2009 | Verma |
| 2009/0216545 | A1 | 8/2009 | Rajkumar et al. |
| 2009/0300064 | A1 | 12/2009 | Dettinger |
| 2009/0300471 | A1 | 12/2009 | Dettinger |
| 2010/0005386 | A1 | 1/2010 | Verma |
| 2011/0055206 | A1 | 3/2011 | Martin |
| 2013/0036348 | A1 | 2/2013 | Hazard |
| 2013/0091422 | A1 | 4/2013 | Potnis |
| 2013/0151235 | A1 | 6/2013 | Och |
| 2014/0040270 | A1 | 2/2014 | O'Sullivan |
| 2015/0347393 | A1 | 12/2015 | Futrell |
| 2015/0379887 | A1* | 12/2015 | Becker ................. G09B 17/003 715/229 |
| 2016/0012061 | A1 | 1/2016 | Sperling |
| 2016/0055196 | A1 | 2/2016 | Collins |
| 2016/0224524 | A1 | 8/2016 | Kay |
| 2017/0039176 | A1 | 2/2017 | Broderick et al. |
| 2017/0287090 | A1 | 10/2017 | Hunn |
| 2017/0364495 | A1 | 12/2017 | Srinivasan |
| 2018/0005186 | A1 | 1/2018 | Hunn |
| 2018/0253409 | A1 | 9/2018 | Carlson |
| 2018/0268506 | A1 | 9/2018 | Wodetzki |
| 2018/0365201 | A1 | 12/2018 | Hunn |
| 2018/0365216 | A1 | 12/2018 | Kao |
| 2019/0065456 | A1 | 2/2019 | Platow |

OTHER PUBLICATIONS

Bill MacCartney, Michel Galley, Christopher D. Manning, A Phrase-Based Alignment Model for Natural Language Inference, Proceedings of the 2008 Conference on Empirical Methods in Natural Language Processing, pp. 802-811, Honolulu, Oct. 2008.

Ion Androutsopoulos and Prodromos Malakasiotis, A Survey of Paraphrasing and Textual Entailment Methods, Journal of Artificial Intelligence Research 38 (2010) 135-187 Submitted Dec. 2009; published May 2010.

Marie-Catherine De Marneffe, Trond Grenager, Bill MacCartney, Daniel Cer, Daniel Ramage, Chlo'E Kiddon, Christopher D. Manning, Aligning semantic graphs for textual inference and machine reading, American Association for Artificial Intelligence, 2006.

Bill MacCartney and Christopher D. Manning, An extended model of natural logic, Proceedings of the 8th International Conference on Computational Semantics, pp. 140-156, Tilburg, Jan. 2009.

Md Arafat Sultan, Steven Bethard and Tamara Sumner, Back to Basics for Monolingual Alignment: ExploitingWord Similarity and Contextual Evidence, Transactions of the Association for Computational Linguistics, 2 (2014) 219-230. Action Editor: Alexander Koller. Submitted Nov. 2013; Revised Jan. 2014; Published May 2014.

Rada Mihalcea, Courtney Corley, Carlo Strapparava, Corpus-based and Knowledge-based Measures of Text Semantic Similarity, American Association for Artificial Intelligence, p. 775-780, 2006.

Rohit J. Kate, A Dependency-based Word Subsequence Kernel, Proceedings of the 2008 Conference on Empirical Methods in Natural Language Processing, pp. 400-409, Honolulu, Oct. 2008.

Yangfeng Ji and Jacob Eisenstein, Discriminative Improvements to Distributional Sentence Similarity, Proceedings of the 2013 Conference on Empirical Methods in Natural Language Processing, pp. 891-896, Seattle, Washington, USA, Oct. 18-21, 2013.

Richard Socher, Eric H. Huang, Jeffrey Pennington, Andrew Y. Ng, Christopher D. Manning, Dynamic Pooling and Unfolding Recursive Autoencoders for Paraphrase Detection, Advances in Neural Information Processing Systems 24, Jan. 2011.

Michael Heilman and Noah A. Smith, Extracting Simplied Statements for Factual Question Generation, Mar. 29, 2010.

Amit Bronner and Christof Monz, User Edits Classification Using Document Revision Histories, Proceedings of the 13th Conference of the European Chapter of the Association for Computational Linguistics, pp. 356-366, Avignon, France, Apr. 23-27, 2012.

Felix Hill, Kyunghyun Cho, Anna Korhonen, Learning Distributed Representations of Sentences from Unlabelled Data, CoRR, abs/1602.03483, 2016, available at: http://arxiv.org/abs/1602.03483.

Shashi Narayan, Claire Gardent. Hybrid Simplification using Deep Semantics and Machine Translation. the 52nd Annual Meeting of

(56) References Cited

OTHER PUBLICATIONS the Association for Computational Linguistics, Jun. 2014, Baltimore, United States. pp. 435-445, 2014, Proceedings of the 52nd Annual Meeting of the Association for Computational Linguistics.
Kristian Woodsend and Mirella Lapata, Learning to Simplify Sentences with Quasi-Synchronous Grammar and Integer Programming, Proceedings of the 2011 Conference on Empirical Methods in Natural Language Processing, pp. 409-420, Edinburgh, Scotland, UK, Jul. 27-31, 2011.
Bill MacCartney, Christopher D. Manning, Modeling Semantic Containment and Exclusion in Natural Language Inference, Proceeding COLING '08 Proceedings of the 22nd International Conference on Computational Linguistics—vol. 1 pp. 521-528 Association for Computational Linguistics Stroudsburg, PA, USA, 2008.
Bill MacCartney, Christopher D. Manning, Modeling Semantic Containment and Exclusion in Natural Language Inference (a presentation), Aug. 2008.
Hua He and Jimmy Lin, Pairwise Word Interaction Modeling with Deep Neural Networks for Semantic Similarity Measurement, Proceedings of NAACL-HLT 2016, pp. 937-948, San Diego, California, Jun. 12-17, 2016.
Dr. Radim Rehurek, scalability of semantic analysis in natural language processing, Ph.D Thesis, May 2011.
Richard Socher Brody Huval Christopher D. Manning Andrew Y. Ng, Semantic Compositionality through Recursive Matrix-Vector Spaces, Proceedings of the 2012 Joint Conference on Empirical Methods in Natural Language Processing and Computational Natural Language Learning, pp. 1201-1211, Jeju Island, Korea, Jul. 12-14, 2012.
Ilya Sutskever, Oriol Vinyals, Quoc V. Le, Sequence to Sequence Learning with Neural Networks, Advances in neural information processing systems, pp. 3104-3112, 2014.
Ryan Kiros, Yukun Zhu, Ruslan Salakhutdinov, Richard S. Zemel, Antonio Torralba, Raquel Urtasun, Sanja Fidler, Skip-Thought Vectors, arXiv:1506.06726, Jun. 2015.
Radim Rehurek and Petr Sojka, Software Framework for Topic Modeling with Large Corpora, In Proceedings of LREC 2010 workshop New Challenges for NLP Frameworks. Valletta, Malta: University of Malta, 2010. s. 46-50, 5 s. ISBN 2-9517408-6-7.
Samuel R. Bowman, Jon Gauthier, Abhinav Rastogi, Raghav Gupta, Christopher D. Manning, Christopher Potts, A Fast Unified Model for Parsing and Sentence Understanding, arXiv:1603.06021. Mar. 2016.
Xiang Zhang, Yann Lecun, Text Understanding from Scratch, arXiv:1502.01710, Apr. 2016.
Furong Huang, Animashree Anandkumar, Unsupervised Learning of Word-Sequence Representations from Scratch via Convolutional Tensor Decomposition, arXiv:1606.03153, Jun. 2015.
Chambers, N. and Jurafsky, D., "Unsupervised learning of narrative event chains," Proceedings of ACL-08, Columbus, Ohio, Jun. 2008, 789-797.
Chambers, N. and Jurafsky, D., "Unsupervised learning of narrative schemes and their participants," Proceedings of the 47th Annual Meeting of the ACL and the 4th IJCNLP of the AFNLP, Suntec, Singapore, Aug. 2-7, 2009, pp. 602-610.
Chen, D. and Manning, C. D., "A fast and accurate dependency parser using neural networks," Proceedings of the 2014 Conference on Empirical Methods in Natural Language Processing, Doha, Qatar, Oct. 25-29, 2014, pp. 740-750.
Justeson, J. S. and Katz, S. M., "Technical terminology: some linguistic and an algorithm for identification in text," 1995, Natural Language Engineering 1(1):9-27.
Honnibal, M. and Johnson, M., "An improved non-monotonic transition system for dependency parsing," Proceedings of the 2015 Conference on Empirical Methods in Natural Language Processing, Lisbon, Portugal, Sep. 17-21, 2015, pp. 1373-1378.
Petrov, S., et al., "Learning accurate, compact, and interpretable tree annotation," Proceedings of the 21st International Conference on Computational Linguistics and 44th Annual Meeting of the ACL, Sydney, Australia, Jul. 2006, pp. 433-440.
Simonson, D. E., "Investigations of the properties of narrative schemes," a dissertation submitted to the Faculty of the Graduate School of Arts and Sciences of Georgetown University, Washington, DC, Nov. 17, 2017, 259 pages.
Aswani, N., and Gaizauskas, R., "A hybrid approach to align sentences and words in English-Hindi parallel corpora," Jun. 2005, Proceedings of the ACL Workshop on Building and Using Parallel Texts, Association for Computation Linguistics, pp. 57-64.
Manning, C. D., and Schütze, H., Foundations of statistical natural language processing, 1999, The MIT Press, Cambridge, MA, 44 pages.
International Search Report and Written Opinion issued for PCT/US2019/023854 dated Jun. 27, 2019, 17 pages.

* cited by examiner

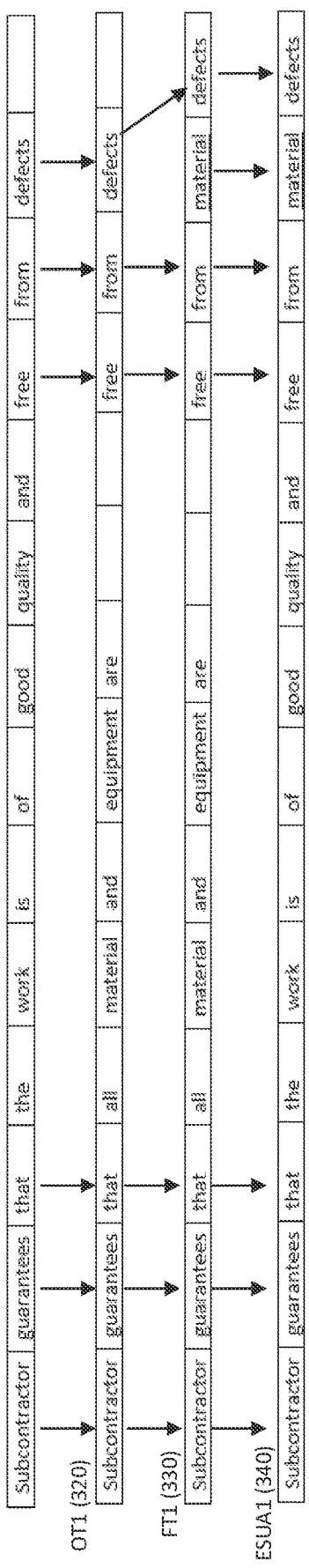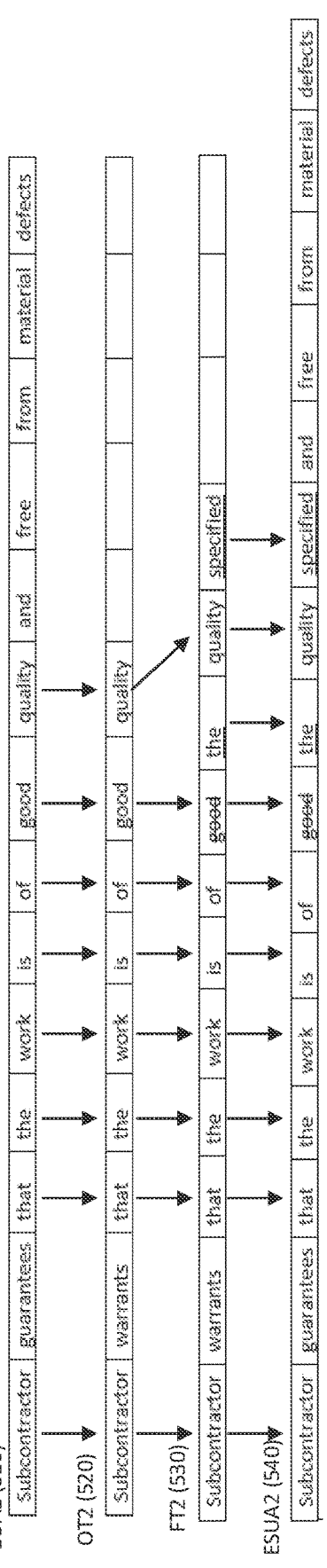
FIG. 5

Unedited Sentence

| | | | | | | | | | | |
|---|---|---|---|---|---|---|---|---|---|---|
| Contractor | shall | indemnify | and | hold | harmless | the | owner | from | all | damages | and | expenses | including | attorney's | fees | 710 |
| Contractor | shall | indemnify | | | | | the | owner | from | all | damages | | | | | 711 |
| Contractor | shall | indemnify | | | | | the | owner | from | all | | | expenses | | | 712 |
| Contractor | shall | indemnify | | | | | the | owner | from | all | | | | attorney's | fees | 713 |
| Contractor | shall | | | hold | harmless | the | owner | from | all | damages | | | | | | 714 |
| Contractor | shall | | | hold | harmless | the | owner | from | all | | | expenses | | | | 715 |
| Contractor | shall | | | hold | harmless | the | owner | from | all | | | | | attorney's | fees | 716 |

Edited Sentence

| | | | | | | | | | | |
|---|---|---|---|---|---|---|---|---|---|---|
| Contractor | shall | indemnify | ~~and~~ | ~~held~~ | ~~harmless~~ | the | owner | from | all | proven | damages | and | expenses | ~~including~~ | ~~attorney's~~ | fees | 720 |
| Contractor | shall | indemnify | | | | the | owner | from | all | proven | damages | | | | | | 721 |
| Contractor | shall | indemnify | | | | the | owner | from | all | proven | | | expenses | | | | 722 |
| Contractor | shall | indemnify | | | | the | owner | from | all | proven | | | | ~~attorney's~~ | fees | 723 |
| Contractor | shall | | | ~~held~~ | ~~harmless~~ | the | owner | from | all | proven | damages | | | | | | 724 |
| Contractor | shall | | | ~~held~~ | ~~harmless~~ | the | owner | from | all | proven | | | expenses | | | | 725 |
| Contractor | shall | | | ~~held~~ | ~~harmless~~ | the | owner | from | all | | | | | ~~attorney's~~ | fees | 726 |

FIG. 7

METHOD AND SYSTEM FOR SUGGESTING REVISIONS TO AN ELECTRONIC DOCUMENT

CROSS REFERENCE TO RELATED APPLICATIONS

This application is a continuation of U.S. application Ser. No. 17/009,069, filed Sep. 1, 2020, which is a continuation of U.S. application Ser. No. 16/689,685, filed Nov. 20, 2019 (now U.S. Pat. No. 10,824,797), which is a continuation of U.S. application Ser. No. 16/244,217, filed Jan. 10, 2019 (now U.S. Pat. No. 10,489,500), which is a continuation of U.S. application Ser. No. 15/227,093, filed Aug. 3, 2016 (now U.S. Pat. No. 10,216,715), which claims the benefit of U.S. Provisional Application No. 62/200,261, filed Aug. 3, 2015, the disclosures of which are incorporated herein in their entirety by reference.

BACKGROUND OF THE INVENTION

Field of the Invention

The embodiments of the invention relate to a method and system for revising electronic documents, and more particularly, to a method and system for suggesting edits to an electronic document. Although embodiments of the invention are suitable for a wide scope of applications, it is particularly suitable for suggesting revisions to electronic documents where the suggested revisions are similar to past revisions of similar documents.

Discussion of the Related Art

In the related art, revisions to electronic documents are performed primarily manually by a human editor. In the case of an electronic document such a legal contract, an editor may choose to make revisions that are similar to past revisions for legal consistency. Likewise, an editor may choose not to make revisions to documents (or its constituent parts) that are similar to past documents. For example, if a particular paragraph was revised in a particular way in a prior similar document, an editor may choose to edit the particular paragraph in the same way. Similarly, an editor may choose to make revisions that are similar to past revision to meet certain requirements.

The related art includes software that performs redlining to indicate differences between an original document and an edited document. Redlining, generally, displays new text as underlined and deleted text as strikethrough.

The related art also include software such as Dealmaker by Bloomberg that compares document against a database of related documents to create redlines. The software displays, differences between a selected contract or part thereof and the most common contract or part thereof in the Dealmaker database of contracts. For example, the user may want to compare a lease against other leases. Dealmaker allows the user to compare the lease to the most common form of lease within the Dealmaker database and create a simple redline. Likewise, the user can compare a single provision against the most standard form of that provision within the dealmaker database and create a simple redline.

Many problems exist with the prior art. For example, it may be difficult for an editor to know which of many prior documents contained similar language. Similarly, an editor might not have access to all prior documents or the prior documents might be held by many different users. Thus, according to the related art, an editor may need to look at many documents and coordinate with other persons to find similar language. It can be time consuming and burdensome to identify and locate many prior documents and to review changes to similar language even with the related art redlining software. In some cases, previously reviewed documents can be overlooked and the organization would effectively lose the institutional knowledge of those prior revision. In the case of a large organization, there may be many editors and each individual editor may not be aware of edits made by other editors. Identifying similarity with precision can be difficult for an editor to accomplish with consistency.

Additionally, edits made by human editors are limited by the editor's understanding of English grammar and the content of the portions being revised. As such, different human editors may revise the same portion of a document differently, even in view of the same past-documents.

There are also problems with the related art Dealmaker software as it is primarily a comparison tool. Dealmaker can show the lexical differences between a selected document, or part thereof, and the most common form of that document within the Dealmaker database.

Dealmaker, however, does not propose revisions to documents that will make them acceptable to the user. Similarly, Dealmaker considers only a single source for comparison of each reviewed passage. Dealmaker only displays a simple redline between the subject document and the database document. Dealmaker does not consider parts of speech, verb tense, sentence structure, or semantic similarity. Thus Dealmaker may indicate that particular documents and clauses are different when in fact they have the same meaning.

SUMMARY OF THE INVENTION

Accordingly, embodiments of the invention are directed to a method and system for suggesting revisions to an electronic document that substantially obviates one or more of the problems due to limitations and disadvantages of the related art.

An object of embodiments of the invention is to provide an automated method of suggesting edits to a document.

Another object of embodiments of the invention is to provide a database of previously edited documents.

Yet another object of embodiments of the invention is to provide an engine to parse and compare a document to previously reviewed documents.

Still another object of embodiments of the invention is to provide a system that remembers revisions made to documents and suggests such revisions in view of future similar documents.

Another object of embodiments of the invention is to identify and remember text that was not edited.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a method and system for suggesting revisions to an electronic document tokenizing a document-under-analysis ("DUA") into a plurality of statements-under-analysis ("SUAs"), selecting a first SUA of the plurality of SUAs, generating a first similarity score for each of a plurality of the original texts, the similarity score representing a degree of similarity between the first SUA and each of the original texts, selecting a first candidate original text of the plurality of the original texts, and creating an edited SUA ("ESUA") by modifying a copy of the first SUA consistent with a first candidate final text associated with the first candidate original text.

In another embodiment, a method and system for suggesting revisions to an electronic document includes tokenizing a DUA into a plurality of statements-under-analysis ("SUAs"), selecting a first SUA of the plurality of SUAs, generating a first similarity score for each of a plurality of original texts, the first similarity score representing a degree of similarity between the first SUA and each of the original texts, respectively, generating a second similarity score for each of a subset of the plurality of original texts, the second similarity score representing a degree of similarity between the first SUA and each of the subset of the plurality of original texts, respectively, selecting a first candidate original text of the subset of plurality of the original texts, aligning the first SUA with the first candidate original text according to a first alignment, creating an edited SUA ("ESUA") by modifying a copy of the first SUA consistent with a first candidate final text associated with the first candidate original text.

In yet another embodiment, a method and system for suggesting revisions to an electronic document includes tokenizing a DUA into a plurality of statements-under-analysis ("SUAs"), selecting a first SUA of the plurality of SUAs, generating a first similarity score for each of a plurality of original texts, the first similarity score representing a degree of similarity between the first SUA and each of the original texts, respectively, generating a second similarity score for each of a subset of the plurality of original texts, the second similarity score representing a degree of similarity between the first SUA and each of the subset of the plurality of original texts, respectively, selecting a first candidate original text of the subset of plurality of the original texts, aligning the first SUA with the first candidate original text according to a first alignment, creating an edited SUA ("ESUA") by modifying a copy of the first SUA consistent with a first candidate final text associated with the first candidate original text, selecting a second candidate original text of the subset of plurality of the original texts, and modifying the ESUA consistent with a second candidate final text associated with the second candidate original text.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

FIG. 5 is an illustration of multiple statement alignment according to an exemplary embodiment of the invention;

FIG. 7 is an illustration of multiple statement extraction according to an exemplary embodiment of the invention;

DETAILED DESCRIPTION OF THE PREFERRED EMBODIMENTS

Figure 1:
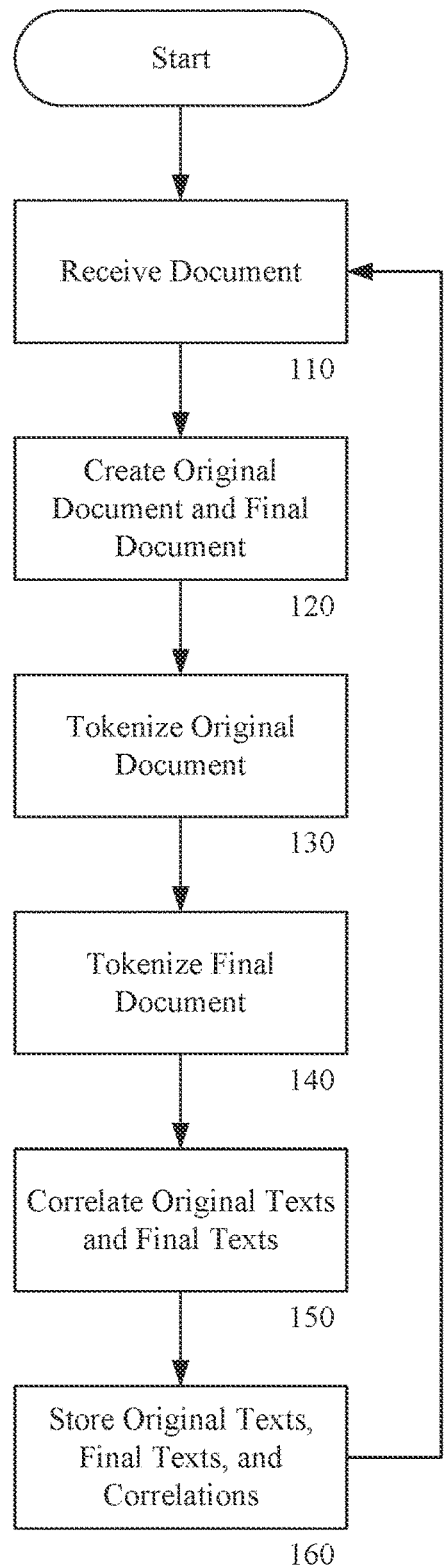
FIG. 1 is a process flowchart for creating a seed database according to an exemplary embodiment of the invention.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity.

Like reference numerals in the drawings denote like elements.

The invention disclosed herein is described, in part, in terms that are unique to the problem being solved. Thus, for the avoidance of doubt, the below descriptions and definitions are provided for clarity. The term DUA means "document under analysis." A DUA is, generally, a document that is being analyzed for potential revision. A DUA can be, for example, a sales contract that is received by a real estate office. The term SUA means "statement under analysis." The DUA can be divided into a plurality of statements, and each statement can be called a SUA. The SUA can be analyzed according to the systems and methods described herein to provide suggested revisions to the SUA. Generally speaking, the SUA can be a sentence and the DUA can be tokenized into SUAs based on sentence breaks (e.g. periods). The SUA, however, is not limited to sentences and the SUA can be, for example, an entire paragraph or a portion or phrase of larger sentence. The term ESUA means "edited statement under analysis." The term "sentence" means sentence in the traditional sense, that is, a string of words terminating with a period that would be interpreted as a sentence according to the rules of grammar. The description of embodiments of the invention herein use the word "sentence" without prejudice to the generality of the invention. One of skill in the art would appreciate that "sentence" could be replaced with "phrase" or "paragraph" and the invention would be equally applicable.

The term "original document" means a document that has not been edited by the methods described herein. The term "final document" means the final version of a corresponding original document. A final document can be an edited version of an original document. The term "original text" means part of an original document (e.g. a sentence). The term "final text" means part of a final document (e.g. a sentence). A phrase or sentence is "compound" when it includes multiple ideas. For example, the sentence "It is hot and rainy" is compound because it includes two ideas: (1) "It is hot"; and (2) "It is rainy."

Embodiments of the invention can further include a "seed database." A seed database can be derived from one or more "seed documents" which are generally original documents and final documents. In some instances, a seed document can be both an original document and a final document such as documents that include "track changes" that are common with documents created in Microsoft Word. The original text of each seed document can be can be tokenized into one or more tokens. The final text of each seed document can be tokenized into one or more tokens. Each token of original text can be correlated with its respective final text. The each original text token and its corresponding final text can be stored in the seed database. In some instances, an original text and a final text can be identical, for example when no edits or changes were made. In such instances, the original text and corresponding identical final text can be saved in the seed database.

The term "similarity score" means a value (or relative value) that is generated from the comparison of an SUA and an original text. The similarity score can be, for example, an absolute number (e.g. 0.625 or 2044) or a percentage (e.g. 95%). Multiple methods for generating a similarity score are described herein or are otherwise known in the art and any such method or formula can be used to generate a similarity score.

The term "aligning" or "alignment" means matching the words and phrases of one sentence to another. Words and phrases can be matched according to lexical or semantic similarity. Alignment is frequently imprecise due to variation between sentences. Thus, "alignment" does not necessarily imply a 1:1 correlation between words and, in many cases, alignment is partial.

FIG. 1 is a process flowchart for creating a seed database according to an exemplary embodiment of the invention. As shown in FIG. 1, a creating a seed database includes receiving 110 a seed document, creating 120 an original document and a final document, tokenizing 130 the original document, tokenizing 140 the final document, correlating 150 each original texts with a corresponding and final text, and storing 160 each original text, its corresponding final text, and the correlation in the seed database.

In step 110, one or more seed documents can be selected. The seed documents can be for example, Microsoft Word documents. The seed documents can include "track changes" such as underline and strike-through to denote additions and deletions, respectively. In an alternative embodiment, a seed document can be a pair of documents such as original version and an edited version. The seed documents relate to a common subject or share a common purpose such as a commercial leases or professional services contracts. The seed documents can represent documents that have been edited and reviewed from the original text to the final text.

The edits and revisions can embody, for example, the unwritten policy or guidelines of a particular organization. As an example, a company may receive a lease document from a prospective landlord. The original document provided by the landlord may provide "this lease may be terminated by either party on 30-days notice." The company may have an internal policy that it will only accept leases requiring 60-days notice. Accordingly, in the exemplary lease, an employee of the company may revise the lease agreement to say "this lease may be terminated by either party on 60-days notice." As a second example, the proposed lease provided by the prospective landlord may include a provision that states "all disputes must be heard in a court in Alexandria, Va." These terms may be acceptable to the company and the company may choose to accept that language in a final version.

In the example of the company, one or more seed documents can be selected in step 110. The seed documents can be for example, commercial leases that have been proposed by prospective landlords and have been edited to include revisions in the form of "track changes" of the apartment rental company. In the alternative, a seed document can comprise two separate documents. The first document can be an original document such as the lease proposed by a prospective landlords. The second document can be an edited version that includes revisions made by the company.

In step optional step 120, a seed document having embedded track changes can be split into two documents. A first document can be an original document and a second document can be a final document.

In step 130, the original text of each original document can be tokenized into a plurality of original texts. The original document can be tokenized according to a variety of hard or soft delimiters. In the simplest form, a token delimiter can be a paragraph. In this example, an original document can be tokenized according to the paragraphs of the document with each paragraph being separated into a distinct token. The original document can also be tokenized according to sentences as indicated by a period mark. Paragraph marks, period marks, and other visible indicia can be called "hard" delimiters. In more complex examples, original document can be tokenized according to "soft" delimiters to create tokens that include only a portion of sentence. A "soft" delimiter can be based on sentence structure rather than a visible indicia. For example, a sentence can be tokenized according to a subject and predicate. In another example, a sentence can be tokenized according to a clause and a dependent clause. In another example, a sentence can be tokenized into a condition and a result such as an if-then statement.

In step 140, the final text of each final document can be tokenized into a plurality of final texts. The tokenization of the final document can be performed in the same manner as described in conjunction with the tokenization of the original document.

In step 150, each original text is correlated to its respective final text. For example, the original text "this lease may be terminated by either party on 30-days notice" can be correlated with the final text "this lease may be terminated by either party on 60-days notice." In a second example where no changes are made, the original text "all disputes must be heard in a court in Alexandria, Va." can be correlated with the final text "all disputes must be heard in a court in Alexandria, Va." In the alternative, the original text of second example can be correlated with flag indicating the original text and the final text are the same. In a third example, where a deletion is made, original text "landlord shall pay all attorneys fees" can be correlated with final text of a null string. In the alternative, the original text of the third example can be correlated with a flag indicating the original text was deleted in its entirety.

In step 160, each original text, its corresponding final text, and the correlation can be saved in the seed database. The correlation can be explicit or implied. In an explicit correlation, each original text can be stored with additional information identifying its corresponding final text and vice versa. In an exemplary embodiment, each original text and each final text can be given a unique identifier. An explicit correlation can specify the unique identifier of the corresponding original text or final text. A correlation can also be implied. For example, an original text can be stored in the same data structure or database object as a final text. In this instance, although there is not explicit correlation, the correlation can be implied by the proximity or grouping. The seed database can then be used to suggest revisions to future documents as explained in greater detail in conjunction with FIG. 2.

It is contemplated that a user editor may desire to take advantage of the novel benefits invention without having a repository of past documents to prime the seed database. Therefore, embodiments of the invention further include a sample database of original text and corresponding final text for a variety of document types. Embodiments of the invention can further include a user questionnaire or interview to determine the user's preferences and then load the seed database with portions of the sample database consistent with the user's answers to the questionnaire. For example, a new user may desire to use the invention but that particular new user does not have previously edited documents with which to prime the seed database. Embodiments of the invention may ask the use questions, such as "will you agree to fee shifting provisions?" If the user answers "yes", then the seed database can be loaded with original and final text from the sample database that include fee shifting. If the user answers "no", then the seed database can be loaded with original and final text from the sample database that has original text including fee shifting and final text where fee shifting has been deleted or edited. In another example, a sample question includes "how many days notice do you require to terminate a lease?" If a user answers "60", then the seed database can be loaded with original and final text from the sample database that has a 60-day lease-termination notice provision, or, as another example, where the original text has N-day termination provisions and the final text has a 60-day termination provision.

Figure 2:
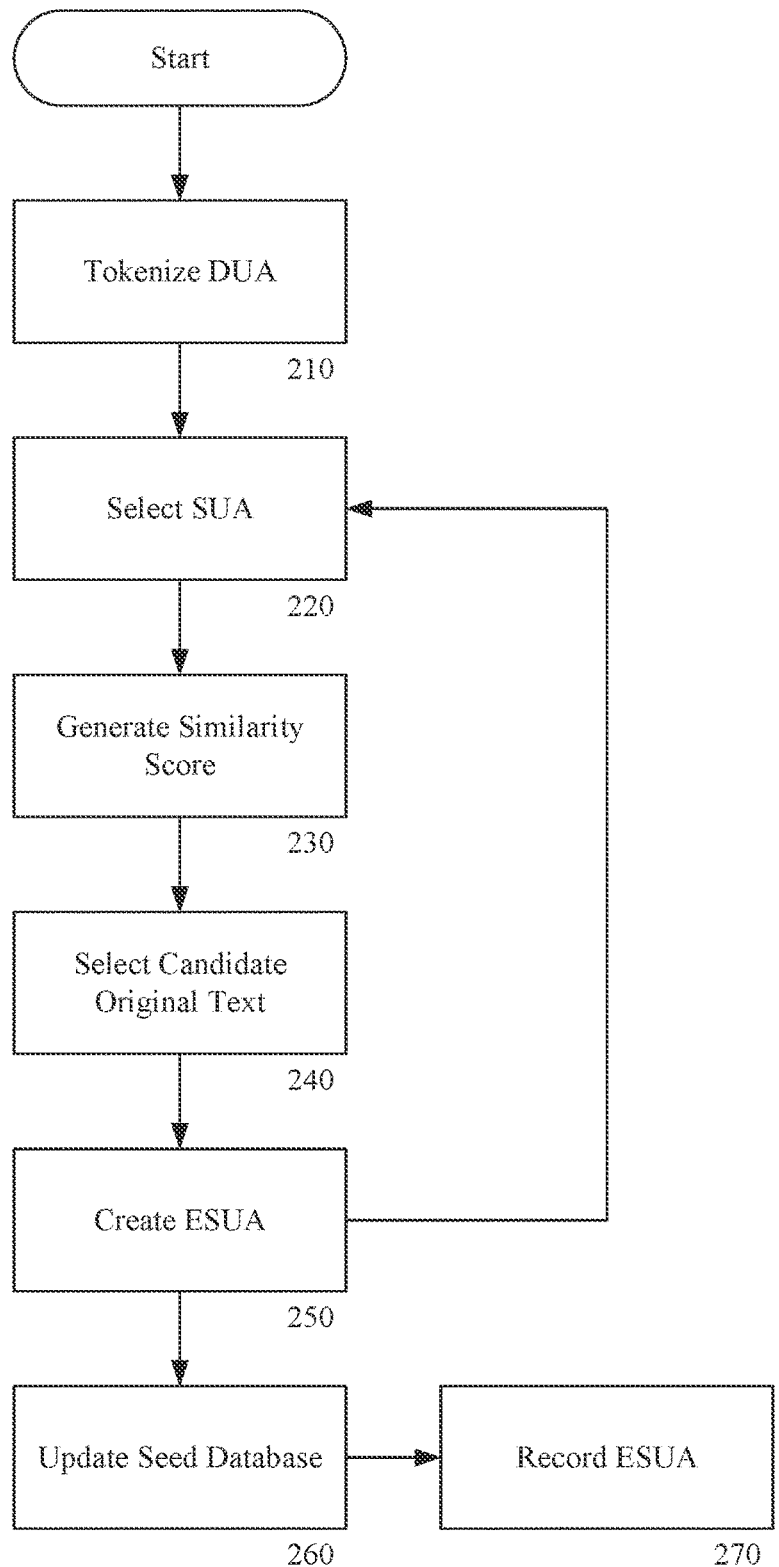
FIG. 2 is a process flowchart for editing a document and updating a seed database according to an exemplary embodiment of the invention.

FIG. 2 is a process flowchart for editing a document and updating a seed database according to an exemplary embodiment of the invention. As shown in FIG. 2, editing a document and updating a seed database can include tokenizing 210 a DUA (document under analysis), selecting 220 a SUA (statement under analysis), generating 230 similarity scores, selecting 240 a candidate original text, creating 250 an ESUA (edited statement under analysis), updating 260 the seed database, and recording 270 the ESUA.

In step 210, a DUA can be tokenized into a plurality of SUAs. The DUA can be tokenized in the same way as described in conjunction with FIG. 1 with tokenizing the original document and final document in creation of the seed database. The DUA can be selected by a user. The DUA can be an electronic document. The DUA can be proposed legal document such as lease, contract, or agreement. In the example of the apartment rental company, a DUA can be a proposed lease agreement provided by a prospective tenant. The DUA can be selected via a file-chooser dialog. The DUA can be selected via a context-menu. The DUA can be selected via a drop-down menu. The DUA can be selected via plug-in for a document management system or an e-mail program.

In step 220, an SUA can be selected. The SUA can be a first SUA of the DUA In subsequent iterations, successive SUAs can be selected such as the second SUA, the third SUA, and so on. Each SUA can be selected in succession.

In step 230, a similarity score can be generated. The similarity score can represent a degree of similarity between the currently selected SUA and each of the original texts in the seed database.

A similarity score for a given SUA and original text can be calculated by comparing the total number of words or the number of words with similar semantics. In exemplary embodiments of the invention, a model of semantically similar words can be used in conjunction with generating the similarity score. For example, the database can specify that "contract" has a similar meaning as "agreement." The step of calculating a similarity score can further include assessing words with similar semantics. For example, using the model, the SUA "the contract requires X" can be calculated to have a similarity score of nearly 100% similar to the original text "the agreement requires X" in the seed database.

Generating a similarity score can include assigning a lower weight to proper nouns. In other embodiments, generating a similarity score can include ignoring proper nouns. Generating a similarity score can include classifying a SUA based on comparing various parts of the SUA. For example, a SUA's subject, verb, object, and modifiers may be compared to each of the subject, verb, object, and modifiers of the original texts in the seed database. Additionally, modifiers of a SUA with a specific characteristics may be compared to the modifiers of various other original texts that all have the same specific characteristics.

The following is an example of two original texts in an exemplary seed database, the corresponding final texts to those two original texts, a SUA from a DUA, and edits made to the SUA consistent with the final texts.

Original Text 1:
"Contractor shall submit a schedule of values of the various portions of the work." Noun: (nominal subject) Contractor
Verb: Submit
Noun: (direct object) Schedule
Corresponding Final Text 1:
"Contractor shall submit a schedule of values allocating the contract sum to the various portions of the work."
Original Text 2:
"Contractor shall submit to Owner for approval a schedule of values immediately after execution of the Agreement."
Noun: (nominal subject) Contractor
Verb: Submit
Noun: (direct object) Schedule
Final Text 2:
"Contractor shall submit to Owner for prompt approval a schedule of values prior to the first application for payment."
SUA:
"Immediately after execution of the Agreement, Contractor shall submit to Owner for
approval a schedule of values of the various portions of the work."
Noun: (nominal subject) Contractor
Verb: Submit
Noun: (direct object) Schedule
Edited SUA:
"Prior to the first application for payment, Contractor shall submit to Owner for prompt approval a schedule of values allocating the contract sum to the various portions of the work."

In the above example, all the sentences contained the same nominal subject, verb, and direct object. The invention can classify these sentences based upon the similarity of the nominal subject, verb, and direct object as having a high similarity. The invention then compare the other parts of the SUA to the original text from Original Text 1 and 2 and made corresponding edits to the similar portions of the DUA sentence.

Generating a similarity score can include assigning a lower weight to insignificant parts of speech. For example, in the phrase, "therefore, Contractor shall perform the Contract" the word "therefore" can be assigned a lower weight in assessing similarity.

Generating a similarity score can include stemming words and comparing the stems. For example, the words, "argue", "argued", "argues", "arguing", and "argus" reduce to the stem "argu" and the stem "argue" could be used for the purpose of generating a similarity score.

The similarity score can be generated according to well-known methods in the art. The similarity score can be a cosine similarity score, a clustering metric, or other well-known string similarity metrics such as Jam-Winkler, Jaccard or Levenshtein. In preferred embodiments a similarity score is a cosine similarity score that represents the degree of lexical overlap between the selected SUA and each of the original texts. A cosine similarity score can be computationally fast to calculate in comparison to other similarity scoring methods. A cosine similarity score can be calculated according to methods known in the art, such as described in U.S. Pat. No. 8,886,648 to Procopio et. al the entirety of which is hereby incorporated by reference. A cosine similarity score can have a range between 0 and 1 where scores closer to 1 can indicate a high degree of similarity and scores closer to 0 can indicate a lower degree of similarity.

A clustering algorithm can plot a loose association of related strings in two or more dimensions and use their distance in space as a similarity score. A string similarity metric can provide an algorithm specific indication of distance ('inverse similarity') between two strings.

In step 240, a candidate original text can be selected. The candidate original text can be the original text having the best similarity score calculated in step 230. As used herein, the term "best" can mean the similarity score indicating the highest degree of similarity. In the alternative, a threshold cut-off can be implemented and a second criteria can be used to perform the selection of step 240. For example, a threshold cut-off can be all similarity scores that exceed a predetermined level such as "similarity scores greater than 0.65". In another example, a threshold cut-off can be a predetermined number of original texts having the best similarity score such as the "top 3" or the "top 5." In an exemplary threshold cut-off only scores that exceed the threshold cut-off are considered for selection in step 240. The selection can include selecting the original text having the best similarity score. The section can include choosing the original text having the largest number of similar words to the SUA. The selection can include choosing the original text having the largest identical substring with the SUA. Subsequent selections under step 240 can omit previously selected original texts.

In step 250, an ESUA (edited statement under analysis) can be created. The ESUA can be created by applying the same edits from a final text associated with the candidate original text to the SUA. The process of applying the edits is described in more particularity in conjunction with discussion of alignment in FIG. 3-FIG. 5. After step 250, the process can transition back to step 220 where another SUA is selected. If there are no more SUAs, the process can transition to step 260 wherein the seed database is update.

Although not shown in FIG. 2, an optional step (not shown) can occur before the update the seed database step 260. In the optional step (not shown) the ESUAs can be displayed to a user for approval and confirmation. A user can further edit the ESUAs according to preference or business and legal objectives. The SUA and the ESUA (including any user-entered revisions thereto) can be stored in the seed database in step 260.

In step 260, the seed database can be updated by saving the SUAs and the corresponding ESUAs. In this way, the seed database grows with each DUA and edits made to an SUA will be retained in the institutional knowledge of the seed database.

In step 270, the ESUAs can be recorded. In a first example, the ESUAs can be recorded at the end of the DUA in an appendix. The appendix can specify amendments and edits to the DUA In this way, and original words of the DUA are not directly edited, but an appendix specifies the revised terms. This first method of recording the ESUAs can be utilized when the DUA is a PDF document that cannot easily be edited. In a second example, the ESUA can be recorded in-line in the DUA Each ESUA can be used to replace the corresponding SUA In embodiments of the invention, the ESUA can be inserted in place of the SUA with "track changes" indicating the edits being made. This second method of recording the ESUAs can be utilized when the DUA is in an easily editable format such as Microsoft Word. In a third example, the ESUAs can be recorded in a separate document than the DUA The separate document can be an appendix maintained as a separate file. The separate document can refer to the SUAs of the DUA and identify corresponding ESUAs. This third method can be utilized when the DUA is a locked or secured document that does not allow editing.

Figure 3:
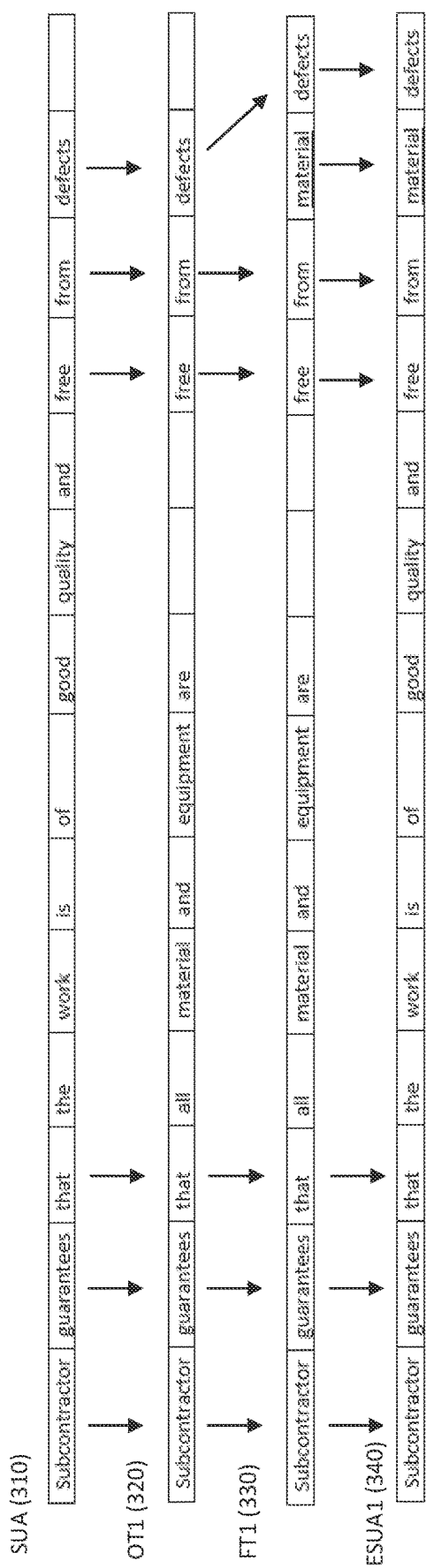
FIG. 3 is an illustration of single alignment according to an exemplary embodiment of the invention.

FIG. 3 is an illustration of single alignment according to an exemplary embodiment of the invention. As shown in FIG. 3, single alignment includes aligning an SUA 310 to an original text "OT1" 320, aligning a corresponding final text "FT1" 330 to the original text 320 and finally creating the ESUA 340. The illustration of FIG. 3 is described as a "single alignment" because the SUA 310 is aligned with OT1 320 one time. To align the SUA 310 and the OT1320, each word of the SUA 310 is matched to a corresponding word of the OT1 320, where applicable. In the example of FIG. 3, the words "subcontractor guarantees that" in the SUA 310 are the same as the words "subcontractor guarantees that" of the OT1 320. These words are denoted as "aligned" by the arrows extending therebetween. The next words of the SUA 310 "the work is of good quality and", however, have no corresponding words in the OT1 320. These words cannot be aligned. Finally, the words "free from defects" in the SUA 310 are matched to the words "free from defects" in the OT1 320 completing the alignment of the SUA 310 to the OT1 320. In this example, only six of the words matched, but the SUA 310 and the OT1 320 are nevertheless described as aligned.

While the example of FIG. 3 illustrates alignment by correlating identical words, the invention is not limited to identical words. Alignment according to the invention further contemplates alignment of similar words such as synonyms or words that are interchangeable in context such as "guarantees" and "warrants." A word embedding model can be used to align sentences having similar meanings although they have few words in common.

Word embedding is the collective name for a set of language modeling and feature learning techniques in natural language processing (NLP) where words or phrases from the vocabulary are mapped to vectors of real numbers in a low-dimensional space relative to the vocabulary size ("continuous space"). A word embedding model can be generated by learning how words are used in context by reading many millions of samples. By training the model on domain relevant text, a word embedding model can be built which effectively understands how words are used within that domain, thereby providing a means for determining when two words are equivalent in a given context. Methods to generate this mapping include neural networks, dimensionality reduction on the word co-occurrence matrix, probabilistic models, and explicit representation in terms of the context in which words appear. Word and phrase embeddings, when used as the underlying input representation, boost the performance in NLP tasks such as syntactic parsing and sentiment analysis.

Word2vec is an exemplary word embedding toolkit which can train vector space models. A method named Item2Vec provides scalable item-item collaborative filtering. Item2Vec is based on word2vec with minor modifications and produces low dimensional representation for items, where the affinity between items can be measured by cosine similarity. Software for training and using word embeddings includes Tomas Mikolov's Word2vec, Stanford University's GloVe and Deeplearning4j. Principal Component Analysis (PCA) and T-Distributed Stochastic Neighbor Embedding (t-SNE) can both be used to reduce the dimensionality of word vector spaces and visualize word embeddings and clusters.

The alignment of the FT1 330 and the OT1 320 can proceed in the same way as the alignment of OT1 320 with the SUA 310. As shown in FIG. 3, the words of FT1 330 can be matched to the aligned words of the OT1 320.

After the SUA 310, the OT1 320, and the FT1 330 are aligned, the edits from the FT1 330 can be applied to the SUA 310 to create the ESUA 340. In the example of FIG. 3, the word "material" was added to the FT1 330 and, because of the alignment, the word "material" is added in the corresponding location in the SUA 310 to create the ESUA 340.

An expression can be generated that describes the steps to convert the OT1 320 into the FT1 330. The expression can describe, for example, a series of edit operations, such as [Insert 1,3,1,1] to insert words 1-3 from the FT1 330 at position 1 of the OT1320. A similar expression can be generated that describes the steps to convert the SUA 310 to the OT1 320. The two resulting expressions can be combined to generate a combined expression(s) describing equal subsequences where edits could be applied from the FT1 330 to the SUA 310. Applying the combined expression to the SUA 310 can produce the ESUA 340.

Figure 4:
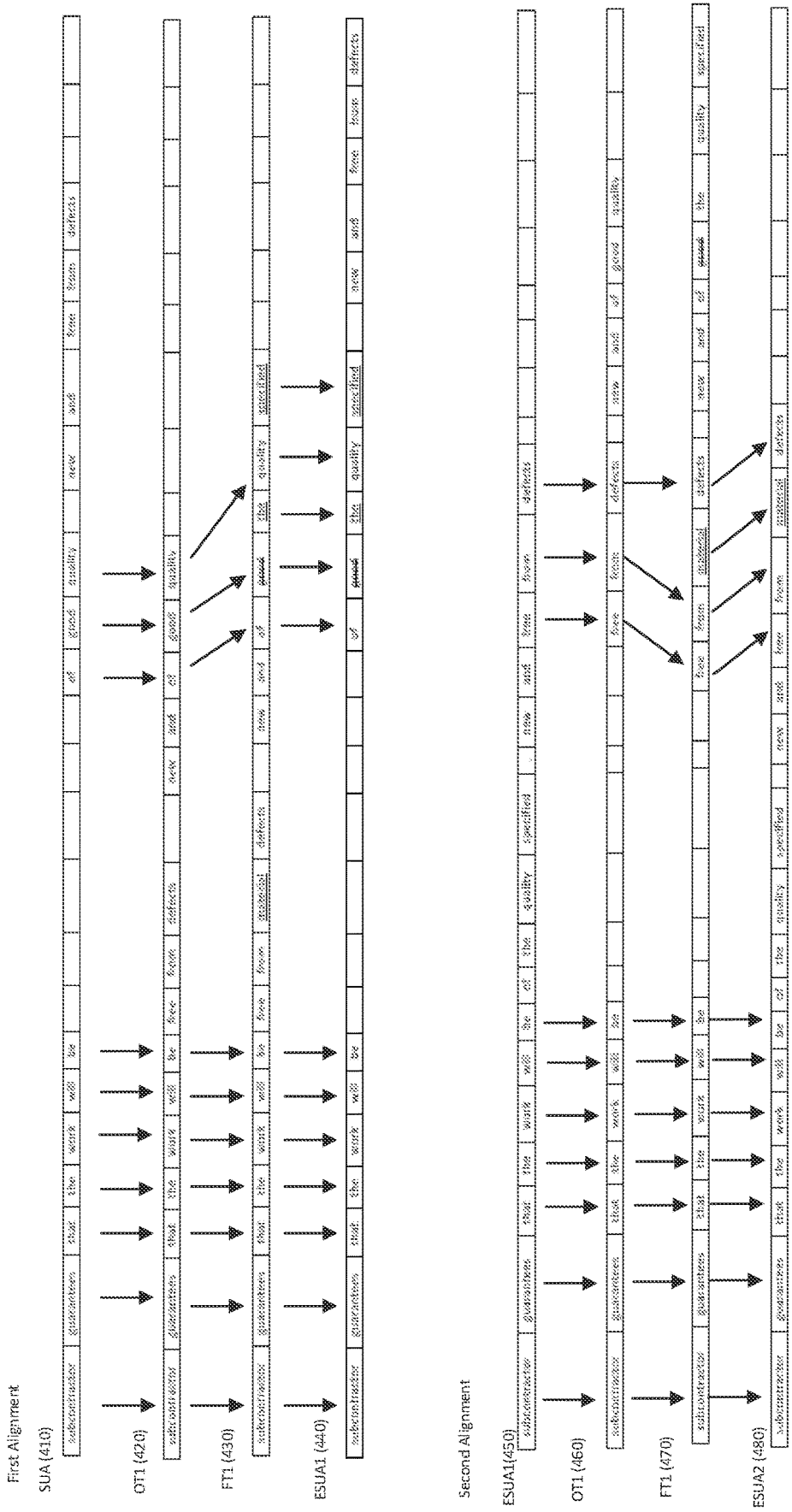
FIG. 4 is an illustration of multiple alignment according to an exemplary embodiment of the invention.

FIG. 4 is an illustration of multiple alignment according to an exemplary embodiment of the invention. As shown in FIG. 4, the SUA 410 and the original text OT1 420 are essentially the same, except that the order of some of the words is changed. In a simplified example, the SUA 410 says "Subcontractor guarantees A, Band C" while the OT1 says "Subcontractor guarantees C, B and A." As shown in the final text FT1 430, edits were made to the words corresponding to clause C and A in the simplified example. In this case, the OT1 420 can be aligned in more than one way so that the edits of the FT1 430 can be applied to the corresponding clauses A and C of the SUA.

In more detail, in a first alignment, the words "subcontractor guarantees that the work will be" of the SUA 410 are aligned with the same words "subcontractor guarantees that the work will be" of the OT1 420. Similarly, the words "of good quality" are aligned with identical words in the OT1 420. Under this alignment, however, the words "new and free from defects" of the SUA 410, however, do not align with any text in the OT1. Nevertheless, the OT1 420 is considered aligned with the SUA 410.

Next, the final text FT1 (430) is aligned with the OT1 (420) and the edits from the FT1 430 are implemented in the corresponding locations of the SUA 410 to create the ESUA 1440.

It will be noted from this example of a first alignment, that some of the edits from the FT1 (e.g. "free from material defects") were not aligned under the first alignment and were not implemented in the ESUA1 440. However, examining the ESUA1 440 reveals that the ESUA1 (and the SUA) included words that should have been edited (e.g. "free from defects"). To capture these edits to the FT1 430 in the ESUA 440, a second alignment is performed.

In more detail, a second alignment begins with the ESUA1 450 that was the output ESUA1 440 from the first alignment. In the second alignment of the OT1 (460) with the ESUA1 (450) the words "free from defects" are aligned instead of the "of good quality" as in the first alignment. Next, the FT1 470 is aligned with the OT (460) and the edits from the FT1 470 are implemented in the corresponding locations of the ESUA1 450 to create the ESUA2 480.

In summary, as shown in FIG. 4, a first alignment aligns one clause of the SUA 410 (e.g. clause A from the simplified example) to the OT1 420 and corresponding edits of the FT1 430 are applied to the SUA 410 to create the ESUA1 440. Next, a second alignment a second clause of the ESUA1 450 (e.g. clause C from the simplified example) to the OT1 460 and the corresponding edits of the FT1 470 are applied to the ESUA1 450 to create the ESUA2 480.

FIG. 5 is an illustration of multiple statement alignment according to an exemplary embodiment of the invention. As shown in FIG. 5 a SUA 310 can be aligned according to a first alignment with a first original text OT1 320. The ESUA1 510 can then be aligned with a second original text OT2 520. The first alignment of FIG. 5 can be the same as described in conjunction with FIG. 3. The OT1 320 can be an original text from the seed database having best a similarity score. The OT2 520 can be an original text from the seed database having a second best similarity score. After the first alignment and edits are performed as described in conjunction with FIG. 3, OT2 520 ca can be selected as a basis to further edit the ESUA1 510. The alignment of the ESUA1 510 with the OT2 520, the alignment of OT2 520 with the correlated final text FT2 530, and the implementation of edits to yield the ESUA2 540 can proceed in the same manner as the first alignment although this time using the ESUA1540 as a starting point and using the OT2 520 and FT2 530. It should be noted that when two or more original texts having identical or similar edits are used in multi-statement alignment, the identical or similar edits are only applied once (e.g. the term "material" would not be inserted twice.)

Multiple statement alignment according to the invention can beneficial when an SUA has high similarity with two or more original texts. By aligning and inserting edits from multiple final texts, the ESUA can more closely resembles prior edits made to similar text. It is contemplated that multiple alignments can be performed on a first original text (as described in conjunction with FIG. 4) and that multiple alignments can be performed with multiple original texts. In more detail, a first original text can be aligned with an SUA according to a first alignment, the first original text can then be aligned with the resultant ESUA according to a second alignment, a second original text can be aligned with the resultant ESUA according to a yet another alignment, and the second original text can be aligned with the resultant ESUA according to a fourth alignment. In this way, the end ESUA has the benefit of edits made to two original texts, each aligned in two different ways. The foregoing example is not limiting and the invention contemplates three, four, or more alignments of a single original text with an SUA and further alignment three, four, or more other original texts.

Figure 6:
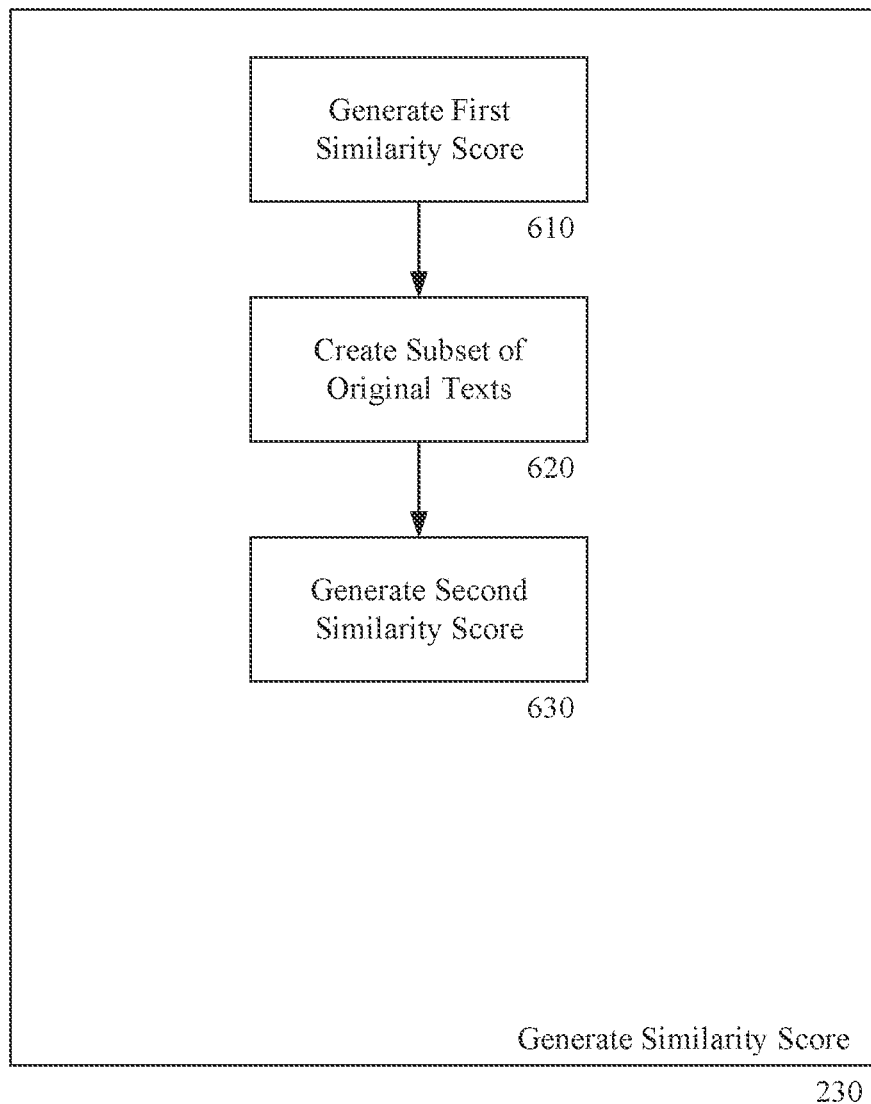
FIG. 6 is a process flowchart for generating a similarity score according to an exemplary embodiment of the invention.

FIG. 6 is a process flowchart for generating a similarity score according to an exemplary embodiment of the invention. As shown in FIG. 6, generating 230 a similarity score can include generating 610 a first similarity score, creating 620 a subset of original texts, and generating 630 a second similarity score. It is contemplated that generation of a similarity score, generally, can be computationally expensive. If a computationally expensive similarity score is generated for every original text in a seed database, the overall process of generating the similarity score can become lengthy. Thus it is contemplated that a computationally "cheap" similarity score be generated for a large number of original texts and a second computationally expensive similarity score be generated for good candidates.

In step 610 a first similarity score can be generated between an SUA and a large number of original texts in the seed database. The similarity score can be generated by a computationally cheap algorithm such as cosine similarity. The scored original texts can represent all original texts in the seed database. The scored original texts can represent a portion of the original texts in the database. The portion can be determined based on the subject matter of the DUA and the content of the SUA. For example, in a DUA that is a lease and an SUA that relates to attorneys fees, the portion of original texts of the seed database can be original texts that relate to attorneys fees in lease agreements. In this way, a first similarity score is not even generated for original texts that are unlikely to have similarity with the DUA In step 620, a subset of the original texts for which a similarity score was generated in step 610 is chosen. The subset can be selected by thresholds and cutoffs. For example, a subset can include original texts that have a similarity score that exceed a threshold.

In another example, a subset can include the original texts having the "top 5" or "top 20" similarity scores.

In step 630, a second similarity score can be generated between the original texts in the subset and the SUA. The second similarity score can be a computationally expensive similarity score such as word-embedding model or syntactic structure oriented model that would require more time but would run on a subset of the original texts that appear to be related by cosine or another fast string matching score. In this way, the number of computationally expensive similarity scores to be calculated can be reduced.

FIG. 7 is an illustration of multiple statement extraction according to an exemplary embodiment of the invention. As shown in FIG. 7, an unedited compound sentence 710 can be "expanded" into many simplified unedited sentences 711-716. Each of the simplified unedited sentences 711-716 represents a logically truthful statement in view of the unedited compound sentence 710. Similarly, the edited compound sentence 720 can be "expanded" into many simplified edited sentences 721-726, each representing a logically truthful statement in view of the edited compound sentence 720. The expansion can be performed over conjunctions or lists of items.

In a more generalized example, the statement "you shall do A and B" is the logical concatenation of "you shall do A" and "you shall do B." It follows then that if the statement is edited to "you shall do A' and B" that the extracted statements "you shall do A'" and "you shall do B" are also true for the edited statement. In this simplified example there are at least two pieces of information having general applicability. First, that A has been edited to A' and second, that B has remained B. In view of the foregoing, embodiments of the invention can suggest A be changed to A' and B remain as B when reviewing other SUAs within the DUA or in other DUAs.

For the purposes of augmenting the seed database with more generalized original texts, an unedited compound statement such as 710 can be expanded to the simplified unedited sentences 711-716. These simplified unedited sentences 711-716 can be separately stored in the seed database together with their corresponding simplified edited sentences 721-726 expanded from the edited compound sentence 720.

Figure 8:
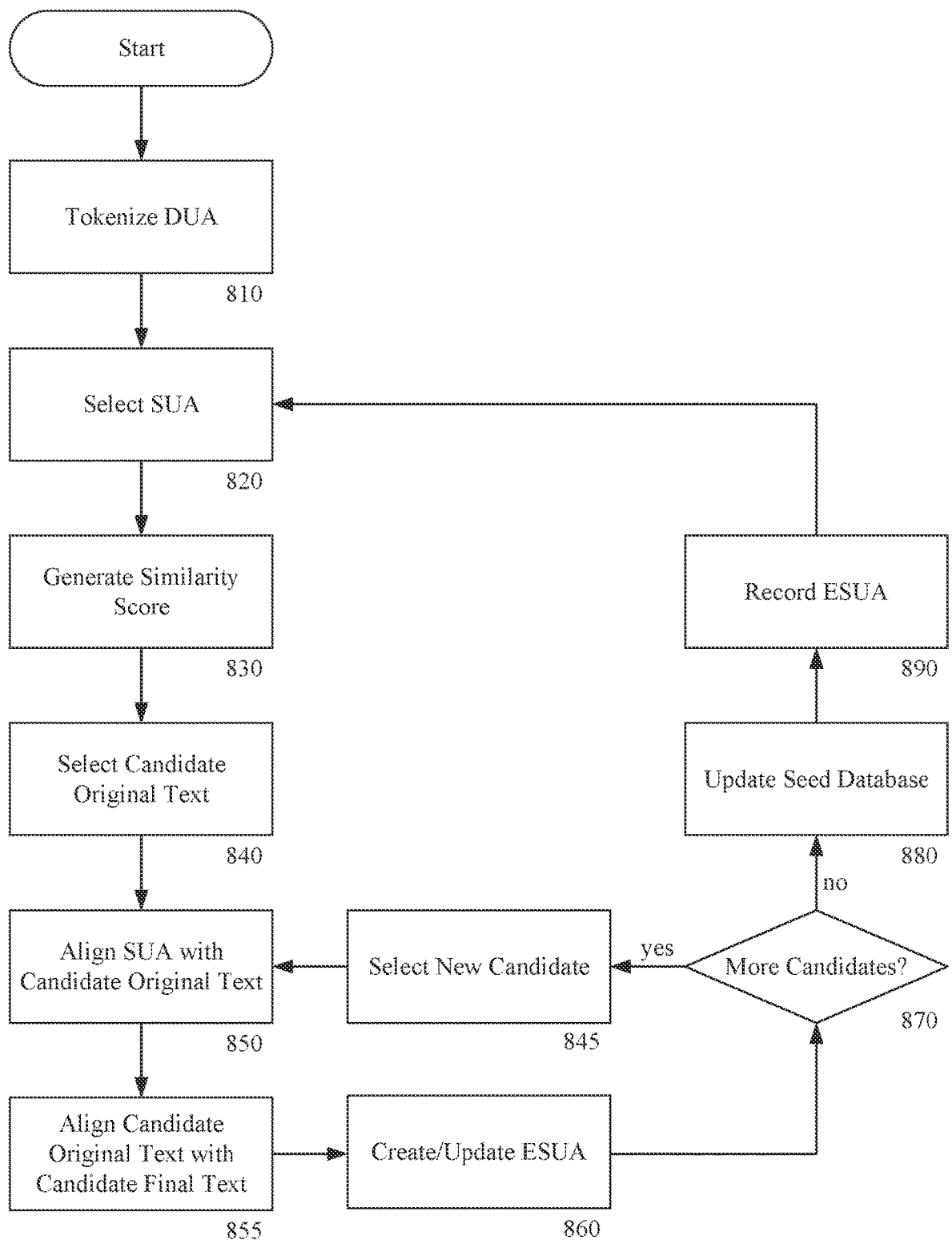
FIG. 8 is a process flowchart for editing a document and updating a seed database according to an exemplary embodiment of the invention.

FIG. 8 is a process flowchart for editing a document and updating a seed database according to an exemplary embodiment of the invention. As shown in FIG. 8, editing a document and updating a seed database can include tokenizing 810 a DUA (document under analysis), selecting 820 a SUA (statement under analysis), generating 830 similarity scores, selecting 340 a candidate original text, aligning 850 the SUA with the candidate original text, aligning 855 a candidate final text with the candidate original text, creating 860 an ESUA (edited statement under analysis), determining 870 whether there are additional candidates, selecting 845 a new candidate, updating 880 the seed database, and recording 8900 the ESUA.

In step 810, a DUA can be tokenized into a plurality of SUAs. The DUA can be tokenized in the same way as described in conjunction with FIG. 1 with tokenizing the original document and final document in creation of the seed database. The DUA can be selected by a user. The DUA can be an electronic document. The DUA can be proposed legal document such as lease, contract, or agreement. In the example of the apartment rental company, a DUA can be a proposed lease agreement provided by a prospective tenant. The DUA can be selected via a file-chooser dialog. The DUA can be selected via a context-menu. The DUA can be selected via a drop-down menu. The DUA can be selected via plug-in for a document management system or an e-mail program.

In step 820, an SUA can be selected. The SUA can be a first SUA of the DUA In subsequent iterations, successive SUAs can be selected such as the second SUA, the third SUA, and so on. Each SUA can be selected in succession.

In step 830, a similarity score can be generated. The similarity score can represent a degree of similarity between the currently selected SUA and at least some of the original texts in the seed database. The similarity score can be generated according to the process described in conjunction with FIG. 6.

In step 840, a candidate original text can be selected. The selected candidate original text can be the original text having the best similarity score. In embodiments where a single similarity score is calculated, the candidate original text can be selected from the original texts for which a similarity score was generated. In embodiments where two similarity scores are generated, such as described in conjunction with FIG. 6, the candidate original text can be selected from the original texts for which a second similarity score was generated.

A candidate original text can be selected from a filtered subset of the original texts. For example, a candidate original text can be selected from the "top 10" original texts based on a second similarity score. In another example, a candidate original text can be selected from the set of original texts having a second similarity score that exceeds a predetermined threshold. The selection can be the "best" similarity score. The selection can be the original text from a filter list having a longest matching substring in common with the SUA.

In step 850, the selected candidate original text can be aligned with the SUA.

In step 855, the candidate edited text can be aligned with the candidate original text.

In step 860, an ESUA (edited statement under analysis) can be created. The ESUA can be created by applying edits from a final text associated with the candidate original text to the SUA. The process of applying the edits is described in more particularity in conjunction with discussion of alignment in FIG. 3-FIG. 5.

The foregoing alignment and creating an ESUA (steps 850, 855, and 860) of the embodiment described in FIG. 8 can be described as a single alignment of an SUA, original text, and edited text. However, it should be appreciated that the steps 850, 855, and 860 could be repeated to achieve a second alignment and updating of the ESUA consistent with the example described in conjunction with FIG. 4.

In step 870, it can be determined if there are additional candidate original texts. In the example where a "top 10" original texts are filtered from the original texts for consideration in the selection step 840, the decision step 870 can evaluate whether there are additional original texts of the "top 10" to be considered. If there are additional candidates, the process can transition to select new candidate step 845. If no candidates remain, the process can transition to update seed database step 880.

The select new candidate step 845 can be consistent with the multiple statement alignment described in conjunction with FIG. 5. In the example where a "top 10" original texts were filtered for potential selection in step 840, an unselected one of the "top 10" can be selected in the select new candidate step 845. The new candidate original text and its corresponding edited text can be aligned with the SUA in steps 850 and 855. The ESUA can be updated with the edits from the new candidate in step 860.

Although not shown in FIG. 8, it should be appreciated that throughout the process of suggesting edits, various edits and suggestions can be presented to the user for confirmation and further editing prior to finalizing a document. For example, a user interface for a software application implementing the invention can provide a visual indication of all of the edits suggested to a DUA and its SUAs. A user can use such a user interface to further revise the ESUAs or edit unedited SUAs. A user can further select an unedited SUA and manually enter revisions. Revisions entered by a user can be stored in the seed database in step 880.

In update seed database step 880, the seed database can be updated by saving the SUAs and the corresponding ESUAs. In some cases the SUA will not have a corresponding ESUA indicating that the text was acceptable as proposed. In these cases, an ESUA can be generated that is identical to the SUA and both SUA and identical ESUA can be stored in the seed database. In this way, the seed database grows with each DUA and edits made to an SUA or SUAs accepted without revision will be retained in the institutional knowledge of the seed database. Although this step 880 is illustrated as occurring after the step 860 and before the step 820, it should be appreciated that the updating the seed database step 880 can occur at any time after an ESUA is created. In a preferred embodiment, the updating the seed database step 880 can occur after all SUAs of a DUA have been analyzed and and a user has confirmed the edits are accurate and complete.

In step 890, the ESUAs can be recorded. In a first example, the ESUAs can be recorded at the end of the DUA in an appendix. The appendix can specify amendments and edits to the DUA In this way, and original words of the DUA are not directly edited, but an appendix specifies the revised terms. This first method of recording the ESUAs can be utilized with the DUA is a PDF document than cannot easily be edited. In a second example, the ESUA can be recorded in-line in the DUA Each ESUA can be used to replace the corresponding SUA In embodiments of the invention, the ESUA can be inserted in place of the SUA with "track changes" indicating the edits being made. This second method of recording the ESUAs can be utilized when the DUA is in an easily editable format such as Microsoft Word. In a third example, the ESUAs can be recorded in a separate document. The separate document can refer to the SUAs of the DUA and identify corresponding ESUAs. This third method can be utilized when the DUA is a locked or secured document that does not allow editing.

Again, although this step 890 is illustrated as occurring after the step 880 and before the step 820, it should be appreciated that the recording the ESUA step 890 can occur at any time after an ESUA is created. In a preferred embodiment, the recording the ESUA step 890 can occur after all SUAs of a DUA have been analyzed and a user has confirmed the edits are accurate and complete.

Figure 9:
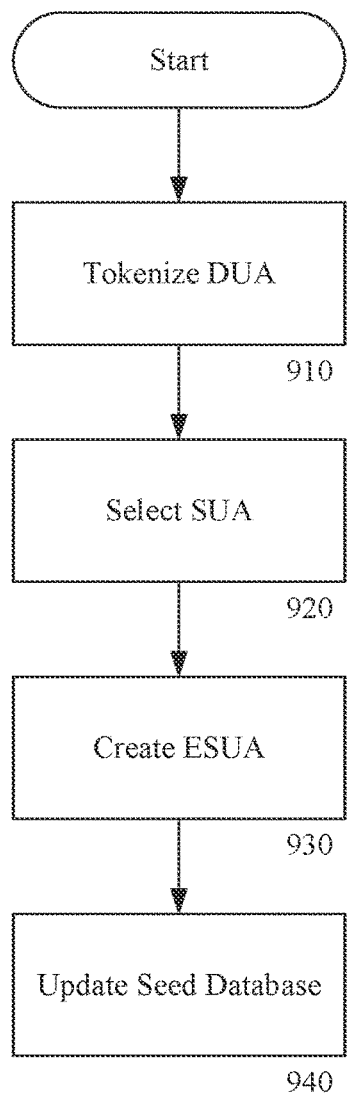
FIG. 9 is a process flowchart for editing a document and updating a seed database according to an exemplary embodiment of the invention.

FIG. 9 is a process flowchart for editing a document and updating a seed database according to an exemplary embodiment of the invention. As shown in FIG. 9, editing a document and updating a seed database can include tokenizing 910 a DUA, selecting 920 an SUA, creating 930 an ESUA, and updating 940 a seed database.

In step 910, a DUA can be tokenized in the same manner as described in conjunction with step 210 of FIG. 2.

In step 920, a SUA can be manually selected by a user. A user can select an SUA that the user desires to modify.

In step 930, a user can manually modify an SUA to create an ESUA. This process of selecting and editing can be consistent with a user revising a document according to their knowledge, expertise, or business objectives.

In step 940, the SUA and the ESUA can be stored in a seed database. If the SUA was not edited, the SUA can be copied to the ESUA and both can be stored in a seed database. The embodiment of FIG. 9 can be useful when a seed database does not exist. The embodiment of FIG. 9 can be useful when the seed database has insufficient content to suggest useful edits. In this way, the seed database can grow from normal document review and editing.

Embodiments of the invention can be implemented as a software application executable on a computer terminal or distributed as a series of instructions recorded on computer-readable medium such as a CD-ROM. The computer can have memory such as a disk for storage, a processor for performing calculations, a network interface for communications, a keyboard and mouse for input and selection, and a display for viewing. Portions of the invention, such as the seed database, can be implemented on a database server or stored locally on a user's computer. Embodiments of the invention can be implemented in a remote or cloud computing environment where a user can interface with the invention through a web browser. Embodiments of the invention can be implemented as plug-in for popular document editing software (e.g. Microsoft Word) that can suggest revisions to an SUA through the document editing software.

It will be apparent to those skilled in the art that various modifications and variations can be made in the method and system for suggesting revisions to an electronic document without departing from the spirit or scope of the invention. Thus, it is intended that embodiments of the invention cover the modifications and variations of this invention provided they come within the scope of the appended claims and their equivalents.

What is claimed is:

1. A computer-implemented method for suggesting revisions to text data, the method comprising:
   obtaining an electronic document under analysis (DUA);
   tokenizing the DUA into one or more statements under analysis (SUAs);
   obtaining a plurality of candidate original texts from a seed database;
   generating a similarity score for each candidate original text of the plurality of candidate original texts, the similarity score representing a degree of similarity between the one or more SUAs and each of the candidate original texts;
   selecting a subset of candidate original texts from the plurality of candidate original texts based on the generated similarity score for each of the plurality of candidate original texts;
   selecting a first candidate original text from the subset of candidate original texts; and
   determining, using a natural language processing (NLP) alignment of the first SUA and the first candidate original text, an edit operation to apply to the DUA.

2. The method of claim 1, wherein each of the selected candidate original texts included in the subset of candidate original texts has a similarity score exceeding a predetermined threshold.

3. The method of claim 1, wherein the subset of candidate original texts comprises a predetermined number of candidate original texts, and the method further comprises:
   selecting a number of candidate original texts corresponding to the predetermined number for inclusion in the subset of original texts.

4. The method of claim 3, wherein each candidate original text included in the subset of candidate original texts has a similarity score that exceeds a similarity score of a remainder of candidate original texts of the plurality of candidate original texts not selected for inclusion in the subset.

5. The method of claim 1, wherein the first candidate original text has a first similarity score that is greater than a similarity score of a remainder of candidate original texts included in the subset.

6. The method of claim 1, wherein the first candidate original text has a first matching substring with the SUA that is longer than any matching substrings between the SUA and a remainder of candidate original texts included the subset of candidate original texts other than the first candidate original text.

7. The method of claim 1, further comprising:
   generating a second similarity score for each candidate original text in the subset of candidate original texts.

8. The method of claim 7, wherein the selecting the first candidate original text from the subset of candidate original texts is based on the second similarity score for each candidate original text in the subset of candidate original texts.

9. A non-transitory computer readable medium storing instructions configured to cause a computer to perform the method of claim 1.

10. A system for suggesting revisions to text data, the system comprising:
    a processor;
    a non-transitory computer readable memory coupled to the processor, wherein the processor is configured to:
    obtain an electronic document under analysis (DUA);
    tokenize the DUA into one or more statements under analysis (SUAs);
    obtain a plurality of candidate original texts from a seed database;
    generate a similarity score for each candidate original text of the plurality of candidate original texts, the similarity score representing a degree of similarity between the one or more SUAs and each of the candidate original texts;
    select a subset of candidate original texts from the plurality of candidate original texts based on the generated similarity score for each of the plurality of candidate original texts;
    select a first candidate original text from the subset of candidate original texts; and
    determine, using a natural language processing (NLP) alignment of the first SUA and the first candidate original text, an edit operation to apply to the DUA.

11. The system of claim 10, wherein each of the selected candidate original texts included in the subset of candidate original texts has a similarity score exceeding a predetermined threshold.

12. The system of claim 10, wherein the subset of candidate original texts comprises a predetermined number of candidate original texts, and wherein the processor is further configured to:
    select a number of candidate original texts corresponding to the predetermined number for inclusion in the subset of original texts.

13. The system of claim 12, wherein each candidate original text included in the subset of candidate original texts has a similarity score that exceeds a similarity score of a remainder of candidate original texts of the plurality of candidate original texts not selected for inclusion in the subset.

14. The system of claim 10, wherein the first candidate original text has a first similarity score that is greater than a similarity score of a remainder of candidate original texts included in the subset.

15. The system of claim 10, wherein the first candidate original text has a first matching substring with the SUA that is longer than any matching substrings between the SUA and a remainder of candidate original texts included the subset of candidate original texts other than the first candidate original text.

16. The system of claim 10, wherein the processor is further configured to:
    generate a second similarity score for each candidate original text in the subset of candidate original texts.

17. The system of claim 16, wherein the select the first candidate original text from the subset of candidate original texts is based on the second similarity score for each candidate original text in the subset of candidate original texts.

* * * * *